H. B. KING & C. McKIERNAN.
STEAM-WHISTLE.
No. 170,274.                                Patented Nov. 23, 1875.
Fig: 1.                    Fig: 2.
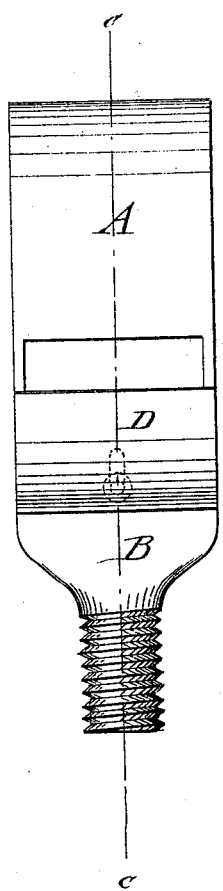
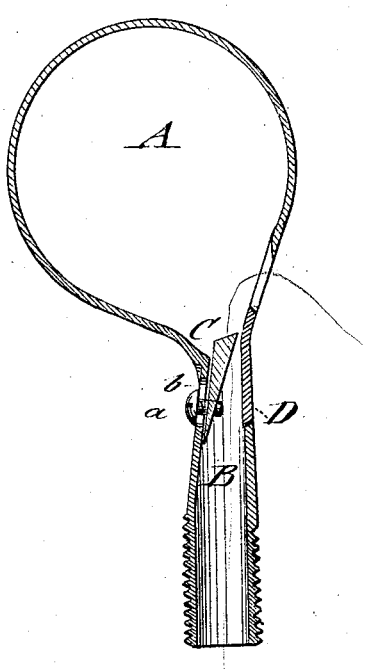
WITNESSES:
Chas Nida
A. F. Terry
INVENTORS
H. B. King and
C. McKiernan
BY
ATTORNEYS.

UNITED STATES PATENT OFFICE.

HENRY B. KING AND CHRISTOPHER McKIERNAN, OF PATERSON, N. J.

IMPROVEMENT IN STEAM-WHISTLES.

Specification forming part of Letters Patent No. 170,274, dated November 23, 1875; application filed September 25, 1875.

*To all whom it may concern:*

Be it known that we, HENRY B. KING and CHRISTOPHER McKIERNAN, of Paterson, in the county of Passaic and State of New Jersey, have invented a new and Improved Steam-Whistle, of which the following is a specification:

In the accompanying drawing, Figure 1 represents a front view, and Fig. 2 a vertical transverse section on the line $c$ $c$, Fig. 1, of our improved steam-whistle.

Similar letters of reference indicate corresponding parts.

The object of our invention is to furnish an improved steam or air whistle that can be manufactured, on account of its simple construction, at less expense than those at present in use, being less liable to breakage, and equally powerful in sound.

The invention will first be described in connection with drawing, and then pointed out in the claim.

In the drawing, A represents the round, oval, or otherwise curved bell or body of our steam or air whistle, and B the flat and narrow throat, which is attached by its lower threaded part to the valve of the boiler or other operating part. The whistle may be provided in the throat part with an inclined gage, C, that is made adjustable by a set-screw, $a$, and slot $b$, for the purpose of governing the amount of steam or air. The whistle may, however, be cast directly with a certain size of issuing-orifice, in which case the movable gage would not be required.

The detachable face-plate D is attached in any suitable manner to guide the steam or air into the body of the whistle. The exit-aperture is above the face-plate, and of suitable width in proportion to the size of the body.

The face-plate D is made detachable, so that the gage or valve C may be conveniently removed or inserted within the throat B.

What we claim as new is—

A steam-whistle having in its throat B a detachable plate, D, for conveniently inserting or removing the gage C, as shown and described.

HENRY B. KING.
CHRISTOPHER McKIERNAN.

Witnesses:
T. B. MOSHER,
ALEX. F. ROBERTS.